United States Patent [19]
Aoki et al.

[11] Patent Number: 5,897,187
[45] Date of Patent: *Apr. 27, 1999

[54] LIQUID CRYSTAL DISPLAY DEVICE HAVING WIDE FIELD ANGLE

[75] Inventors: Hisashi Aoki, Hamura; Tetsushi Yoshida, Sagamiko, both of Japan

[73] Assignee: Casio Computer Co., Ltd., Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/753,092

[22] Filed: Nov. 20, 1996

Related U.S. Application Data

[62] Division of application No. 08/354,595, Dec. 13, 1994.

[30] Foreign Application Priority Data

Dec. 20, 1993 [JP] Japan ................................. 5-320092
Dec. 22, 1996 [JP] Japan ................................. 5-323606

[51] Int. Cl.$^6$ ...................... G02F 1/1343; G02F 1/1345
[52] U.S. Cl. ........................... 349/144; 349/146; 349/148
[58] Field of Search .................................. 349/148, 147, 349/138, 139, 146, 107, 175, 144

[56] References Cited

U.S. PATENT DOCUMENTS

| | | |
|---|---|---|
| 3,967,883 | 7/1976 | Meyerhofer et al. . |
| 4,297,004 | 10/1981 | Nishimura et al. . |
| 4,684,218 | 8/1987 | Aizawa et al. . |
| 4,712,877 | 12/1987 | Okada et al. ................ 349/85 |
| 5,033,823 | 7/1991 | Shannon ..................... 350/333 |
| 5,124,826 | 6/1992 | Yoshioka et al. ............ 349/148 |
| 5,150,233 | 9/1992 | Enomoto et al. ............ 349/148 |
| 5,270,846 | 12/1993 | Watanabe et al. ........... 349/148 |
| 5,412,494 | 5/1995 | Ishiwata et al. ............. 349/148 |
| 5,428,250 | 6/1995 | Ikeda et al. ................. 349/148 |
| 5,539,549 | 7/1996 | Kishida et al. .............. 359/58 |

FOREIGN PATENT DOCUMENTS

| | | |
|---|---|---|
| 56-107215 | 8/1981 | Japan ..................... 349/138 |
| 60-39616 | 3/1985 | Japan . |
| 61-230120 | 10/1986 | Japan . |
| 63-14123 | 1/1988 | Japan . |
| 63-14124 | 1/1988 | Japan . |

*Primary Examiner*—Tiep H. Nguyen
*Attorney, Agent, or Firm*—Frishauf, Holtz, Goodman, Langer & Chick

[57] ABSTRACT

Electric field adjusting layers each of which is different from an aligning film in at least one of a resistivity and a dielectric constant are formed in each pixel on a pixel electrode of a first substrate. An electric field applied to a liquid crystal partially changes in each pixel, and regions which are different from each other in aligned state are formed in each pixel. Therefore, a field angle is widened. A value Δn.d of the liquid crystal is preferably set to be 600 nm or more.

4 Claims, 13 Drawing Sheets

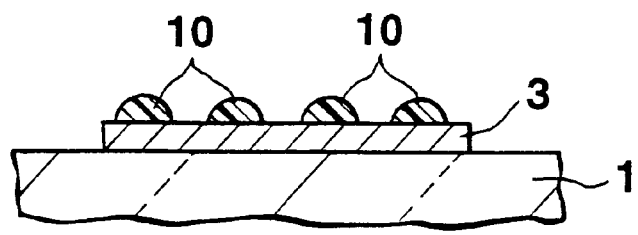
FIG.7A
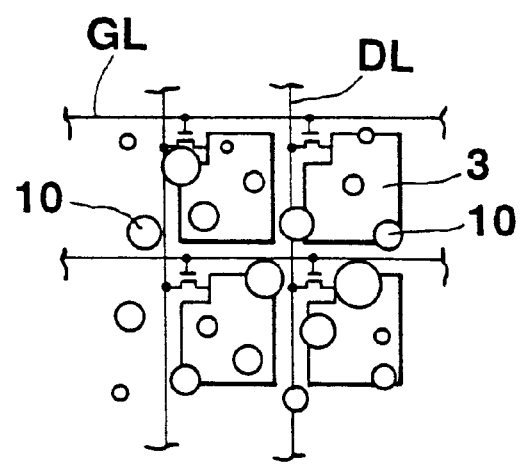
FIG.7B
FIG.8
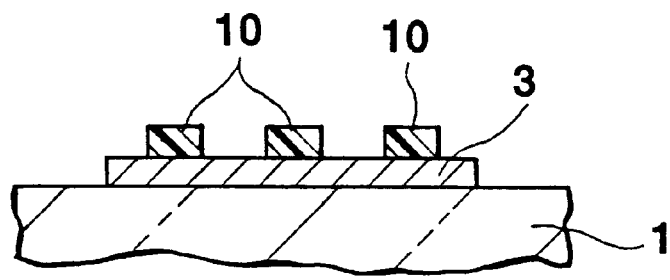

LIQUID CRYSTAL DISPLAY DEVICE HAVING WIDE FIELD ANGLE

This is a division of application Ser. No. 08/354,595 filed Dec. 13, 1994.

BACKGROUND OF THE INVENTION

1. Field of the Invention

The present invention relates to a liquid crystal display device and, more particularly, to a liquid crystal display device which has a wide field angle and can be easily manufactured and driven.

2. Description of the Related Art

As a liquid crystal display device, a liquid crystal display device using a TN (Twisted Nematic) mode or an STN (Super Twisted Nematic) mode is generally used.

FIG. 1 is a sectional view showing a conventional liquid crystal display device using a TN or STN mode, and FIG. 2 shows the aligned states of liquid crystal molecules in the presence of an electric field.

The liquid crystal display device in FIG. 1 is constituted by a pair of transparent substrates 1 and 2; a liquid crystal 9 held between the substrates 1 and 2; and a pair of polarizing plates 14 and 15.

Pixel electrodes 3 are formed on a surface, of the substrate 1, opposing the liquid crystal 9, and an aligning film 5 is formed on the substrate including the pixel electrodes 3.

Black masks 7 for shielding leakage light are formed on a surface, of the substrate 2, opposing the liquid crystal 9, and a transparent insulating film 8 is formed on the substrate including the black masks 7. A counter electrode 4 is formed on the transparent insulating film 8, and an aligning film 6 is formed on the counter electrode 4.

The surfaces of the aligning films 5 and 6 are subjected to an aligning process in directions offset from each other at a predetermined angle (almost 90° in the TN mode, 180 to 270° in the STN mode).

The liquid crystal 9 consists of a nematic liquid crystal added with a chiral agent, and, in the absence of an electric field, molecules 9a of the liquid crystal 9 are aligned in a twisted state having a predetermined pre-tilt angle. When an electric field is applied across the pixel electrodes 3 and the counter electrode 4, as shown in FIG. 2, the liquid crystal molecules 9a are aligned to be vertical to the opposite surfaces of the transparent substrates 1 and 2 in accordance with the strength of the applied electric field.

When the aligned state of the liquid crystal molecules 9a changes, the refractive anisotropy Δn of the liquid crystal 9 with respect to an incident light changes, and a value Δn.d (product between the refractive anisotropy Δn and a layer thickness d of the liquid crystal 9) changes accordingly. For this reason, the polarized state of a linearly polarized light passing through the polarizing plate 15 on the incident side changes in accordance with the value Δn.d of the liquid crystal 9, and thus the intensity of light emerging from the polarizing plate 14 on an exit side changes.

For this reason, when the aligned state of the liquid crystal molecules 9a is controlled by adjusting the applied voltage, an image can be displayed by controlling the transmission and shielding of respective pixel regions with respect to light.

In the liquid crystal display device in which liquid crystal molecules are twisted and aligned as in the TN or STN mode, the gradation level of a display image largely changes depending on an observation direction. For this reason, an angle range in which the display image can be normally observed is small. That is, a field angle is disadvantageously narrow.

A reason why the field angle is narrow will be described below in detail with reference to FIG. 2.

Referring to FIG. 2, reference symbols IA, IB, and IC denote light beams incident on the liquid crystal display device, and reference symbols OA, OB, and OC denote exit light beams corresponding to the incident beams IA, IB, and IC, respectively. When the display image of the liquid crystal display device is observed from a direction almost perpendicular to the screen of the liquid crystal display device, the pixels are displayed by the exit beam OA. When the display image of the liquid crystal display device is observed from the lower right direction of the liquid crystal display device, pixels are displayed by the exit beam OB. When the display image of the liquid crystal display device is observed from the lower left direction of the liquid crystal display device, the pixels are displayed by the exit beam OC.

The tilt angle of the parallel axis of the liquid crystal molecules 9a changes with respect to the incident beams IA, IB, and IC. Thus, different values Δn are obtained with respect to the incident beams IA, IB, and IC. Different apparent liquid crystal layer thicknesses d are obtained with respect to the incident beams IA, IB, and IC. For this reason, the value Δn.d with respect to the incident beam IA, the value Δn.d with respect to the incident beam IB, and the value Δn.d with respect to the incident beam IC, i.e., values Δn.d(IA), Δn.d(IB), and Δn.d(IC), are different from each other.

The intensity of a light beam emerging from the polarizing plate 14 on the exit side is dependent on the value Δn.d. For this reason, the brightness of each pixel changes depending on the incident angle of a beam.

As described above, in the conventional liquid crystal display device, the brightness of each pixel is dependent on an observation direction. Therefore, the observation direction in which a display image can be observed as an image having good contrast between a bright portion and a dark portion is limited, and a narrow field angle is obtained.

As liquid crystal display devices, a positive display type liquid crystal display device in which the polarizing plates 14 and 15 are formed to cause the liquid crystal molecules 9a to shield a beam when the liquid crystal molecules 9a are aligned in a direction perpendicular to the substrate surfaces; and a negative display type liquid crystal display device in which the polarizing plates 14 and 15 are formed to cause the liquid crystal molecules 9a to transmit light when the liquid crystal molecules 9a are aligned in a direction perpendicular to the substrate surfaces are known. In the positive display type liquid crystal display device, a dark portion becomes bright due to a change in incident angle of a beam, thereby degrading the contrast between the dark portion and a bright portion. In the negative display type liquid crystal display device, a bright portion becomes dark due to a change in incident angle of a beam, thereby degrading the contrast between the bright portion and a dark portion.

As a scheme for solving a problem of a narrow field angle, an alignment control scheme and a voltage control scheme are conventionally proposed.

According to the alignment control scheme, one or both of the substrates of a liquid crystal display device are subjected to an aligning process such that liquid crystal molecules are partially aligned at different pre-tilt angles. In this manner, the initial aligned states (twisted and aligned states) of the liquid crystal molecules are made different from each other in regions of each pixel.

In the voltage control scheme, the electrodes of one substrate of a liquid crystal display device are constituted by a plurality of electrodes in units of pixels. Different drive voltages are applied across a plurality of electrodes of each pixel and the electrode of the other substrate, respectively. In this manner, the strength of an electric field applied to the liquid crystal is partially changed to change the tilt angles of the liquid crystal molecules in units of the regions of each pixel.

More specifically, in each of the alignment control scheme and the voltage control scheme, the aligned states of liquid crystal molecules are partially changed in each pixel. In this manner, changes in value Δn.d with respect to a change in incident angle of a beam are different from each other in units of the regions of each pixel. For this reason, even when the incident angle of a beam changes, the average of the values Δn.d slightly changes. Therefore, dependence of pixel brightness on an observation direction is reduced, and a field angle is widened.

However, according to the alignment control scheme, an aligning process for partially aligning liquid crystal molecules at different pre-tilt angles is not easily performed. Therefore, the alignment control scheme cannot be easily utilized in practice.

According to the voltage control scheme, a conventional process may be performed as an aligning process, and a plurality of electrodes can be formed in each pixel by the present photolithographic technique. For this reason, the voltage control scheme can be utilized in practice. However, according to the voltage control scheme, since drive signals having different voltages must be supplied to divided electrodes, respectively, drive control of a liquid crystal display device becomes complex.

SUMMARY OF THE INVENTION

The object of the present invention is to provide a liquid crystal display device having a wide field angle.

It is another object of the present invention to provide a liquid crystal display device which has a wide field angle and can be easily manufactured and/or driven.

In order to achieve the above objects, according to the first aspect of the present invention, there is provided a liquid crystal display device comprising:

first and second substrates arranged to oppose each other and respectively having opposing surfaces;

first and second electrodes, respectively, arranged on the opposing surfaces of the first and second substrates, for forming a plurality of pixels;

a liquid crystal arranged between the first and second electrodes; and a layer formed between the liquid crystal and at least one of the first and second electrodes and partially having a region which is different from another portion in at least one of a resistivity and a dielectric constant in each pixel region defined by an opposing portion between the first and second electrodes.

According to the liquid crystal display device having the above arrangement, an impedance between the first and second electrodes partially changes. Therefore, when a predetermined voltage is applied across the first and second electrodes, electric fields having different strengths corresponding to the differences in impedance are applied to the liquid crystal. For this reason, regions having different aligned states of the liquid crystal which are partially different from each other are obtained in pixel regions, respectively, and a field angle is widened. In addition, the liquid crystal display device can be easily driven because a conventional driving method can be used without any change.

For example, when the layer thickness and material of the liquid crystal are set such that the product Δn.d between a refractive anisotropy Δn and a layer thickness d is set to be larger than 600 nm, a liquid crystal display device having a high luminance and a wide field angle can be obtained.

According to the second aspect of the present invention, there is provided to a liquid crystal display device comprising:

first and second substrates arranged to oppose each other;

a first electrode arranged on a surface, of the first substrate, opposing the second substrate and having a surface formed to have a step in each pixel;

a second electrode arranged on a surface, of the second substrate, opposing the first substrate; and a liquid crystal arranged between the first and second electrodes.

According to the present invention, in the liquid crystal display device with the above arrangement, regions which are different from each other in product Δn.d between a refractive anisotropy Δn and a layer thickness d of the liquid crystal are formed in each pixel. For this reason, the field angle of the liquid crystal display device is widened. In addition, the liquid crystal display device can be drive by a method which is substantially the same as a conventional method, and the liquid crystal display device can be easily performed.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 7A and 7B are sectional and plan views, respectively, of an electric field adjusting layer formed by a spraying method;

FIG. 8 is a sectional view of an electric field adjusting layer formed by a photolithographic method;

DETAILED DESCRIPTION OF THE PREFERRED EMBODIMENTS (First Embodiment)

The first embodiment of a liquid crystal display device obtained by applying the present invention to an active matrix liquid crystal display device will be described below with reference to FIGS. 3 to 5.

Figure 2:
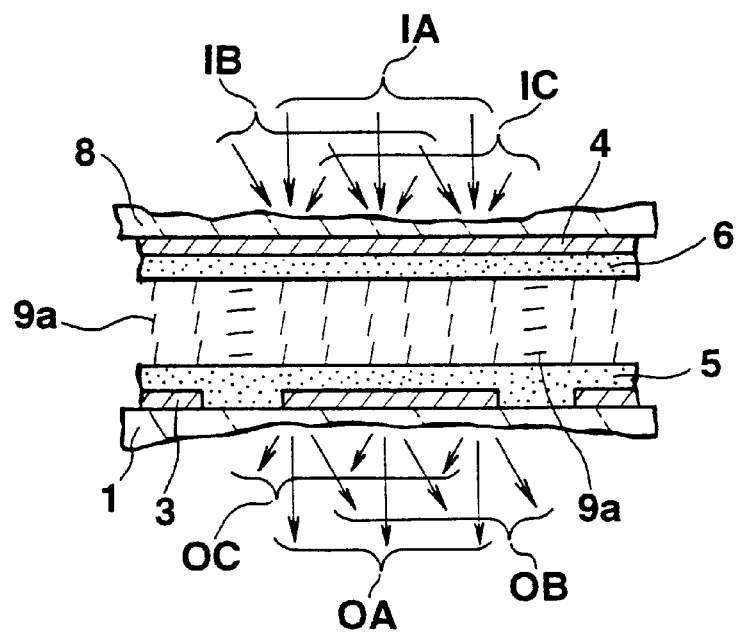
FIG. 2 is a view showing the aligned states of the liquid crystal molecules of the liquid crystal display device in FIG. 1 in the presence of an electric field.
Figure 3:
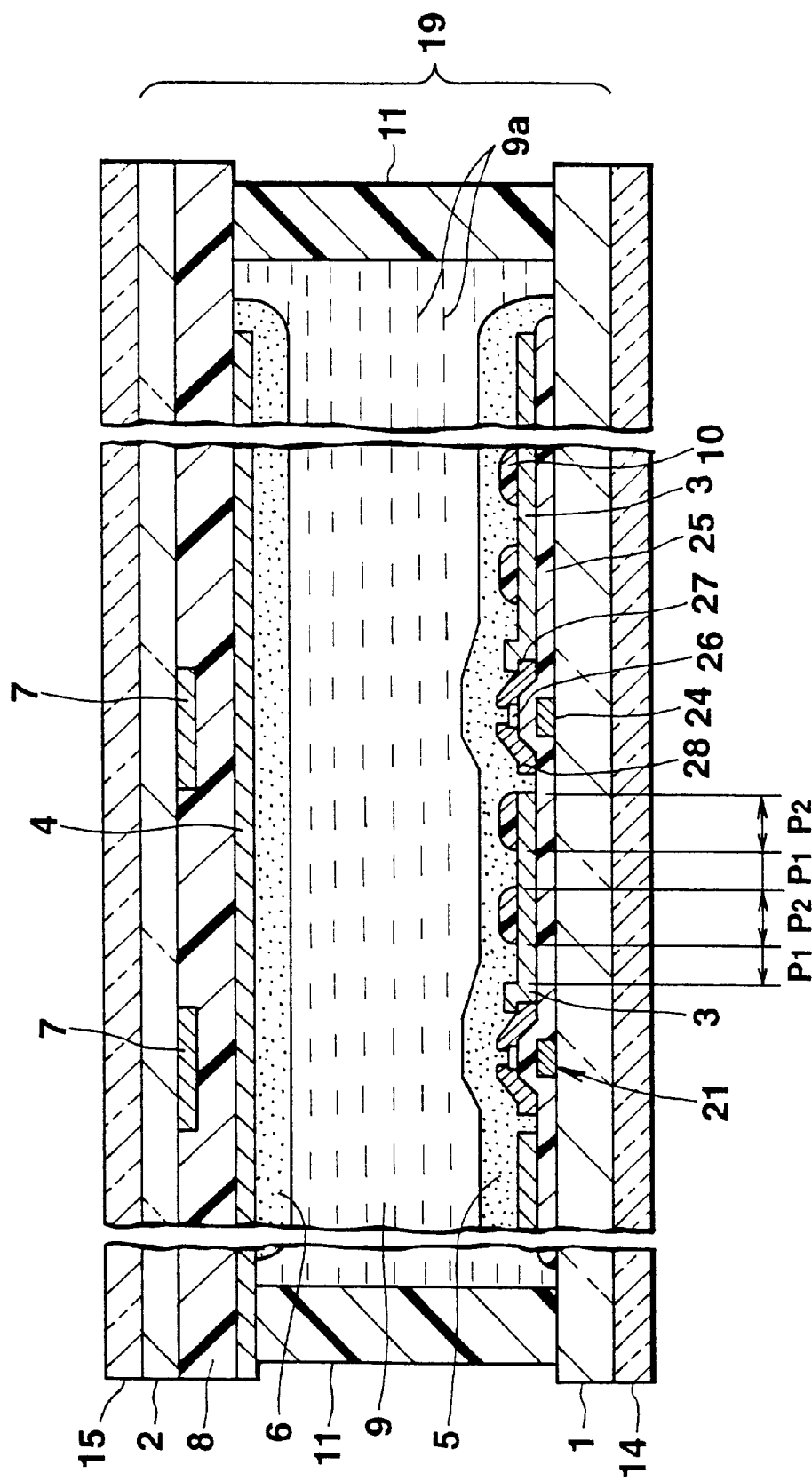
FIG. 3 is a sectional view showing a liquid crystal display device according to the first embodiment of the present invention.
Figure 4:
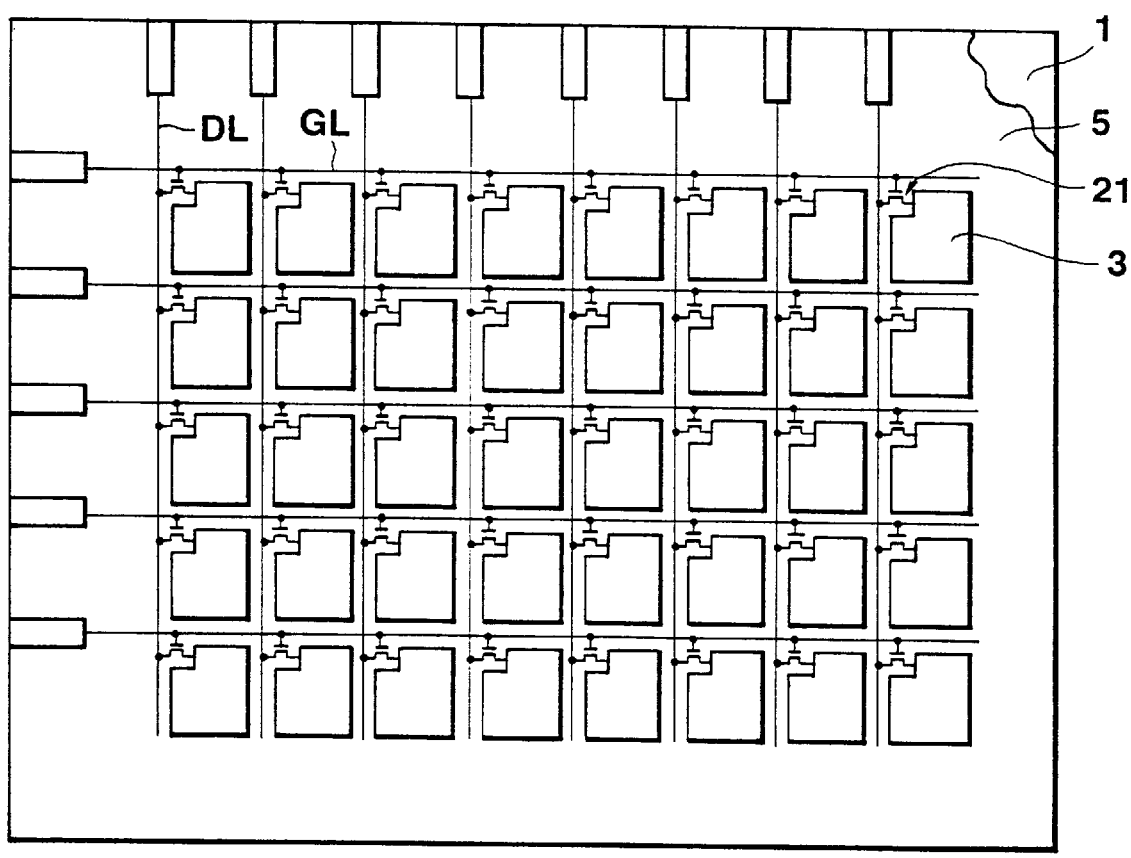
FIG. 4 is a plan view showing the arrangement of a substrate on which TFTs and pixel electrodes are formed.
Figure 5:
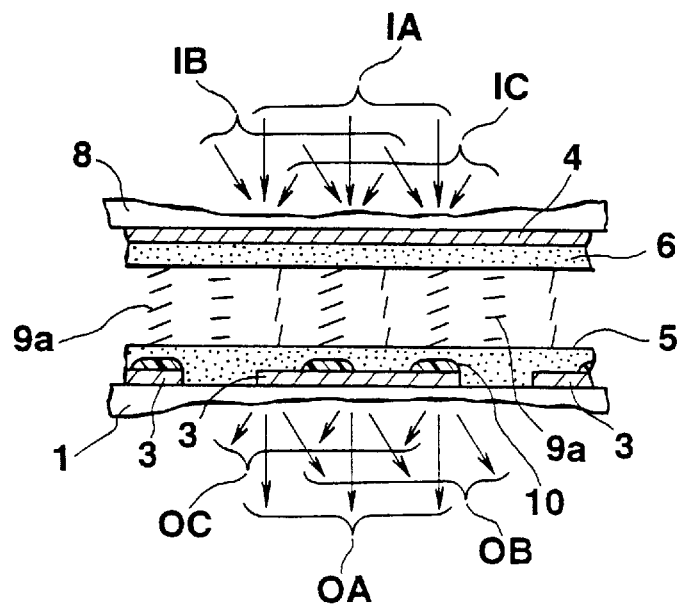
FIG. 5 is a view showing the aligned states of the liquid crystal molecules of the liquid crystal display device in FIG. 3 in the presence of an electric field.

FIG. 3 is a sectional view of the liquid crystal display device according to this embodiment, FIG. 4 is a plan view of a substrate on which TFTs and pixel electrodes are formed, and FIG. 5 shows the aligned states of liquid crystal molecules in the presence of a voltage. Note that the same reference numerals as in FIGS. 1 and 2 denote the same parts in FIGS. 3 to 5.

The liquid crystal display device of this embodiment is a TFT (Thin Film Transistor) liquid crystal display device using a TN or STN mode and using TFTs as switching elements.

As shown in FIG. 3, the liquid crystal display device of this embodiment comprises: a liquid crystal cell 19 constituted by a pair of substrates 1 and 2, a sealing member 11 for joining the substrates 1 and 2, and a liquid crystal 9 sealed between the sealing member 11 and the substrates 1 and 2; and a pair of polarizing plates 14 and 15 formed to interpose the liquid crystal cell 19.

The substrate 1 and 2 are transparent insulating substrates consisting of glass or the like.

On the substrate 1, as shown in FIG. 4, pixel electrodes 3 and TFTs 21 serving as switching elements are arranged in a matrix.

The pixel electrodes 3 consist of a transparent conductive material such as ITO.

Each TFT 21 comprises: a gate electrode 24 formed on the substrate 1; a gate insulating film 25 covering the gate electrode 24 and consisting of silicon nitride (SiN) or the like; a semiconductor layer 26 formed on the gate insulating film 25 to oppose the gate electrode 24; a source electrode 27 connected to one end of the semiconductor layer 26; and a drain electrode 28 connected to the other end of the semiconductor layer 26. The gate electrode 24 of each TFT 21 is connected to a gate line GL of a corresponding one of rows, each source electrode 27 is connected to a corresponding one of the pixel electrodes 3, and each drain electrode 28 is connected to a data line DL of a corresponding one of columns.

Transparent electric field adjusting layers or sections 10 are partially formed on each pixel electrode 3.

An aligning film 5 consisting of a dielectric such as polyimide is formed on the pixel electrodes 3, the TFTs 21, and the electric field adjusting layers 10.

On the substrate 2, black masks 7, formed in regions except for pixel regions and consisting of a light-shielding metal, for shielding leakage light; a transparent insulating film 8 formed to cover the black masks 7; a counter electrode 4 formed on the transparent insulating film 8 to oppose the pixel electrodes 3; and an aligning film 6 formed on the counter electrode 4 and consisting of a dielectric. The counter electrode 4 consists of a transparent conductive material such as ITO.

The aligning films 5 and 6 consist of, e.g., a homogeneous aligning material such as a polyimide-based aligning material. An aligning process such as a rubbing process is performed on the surfaces of the aligning films 5 and 6. The directions of the aligning treatment (rubbing directions) to the aligning films 5 and 6 are offset from each other at a predetermined angle (almost 90° in a TN mode and almost 180 to 270° in an STN mode).

The liquid crystal 9 consists of a nematic liquid crystal having positive dielectric anisotropy and added with a levorotatory or dextrorotatory optical active material (e.g., chiral liquid crystal). Molecules 9a of the liquid crystal 9 are aligned in the direction of aligning treatment (hereinafter called aligning directions) to the aligning films 5 and 6 at predetermined pre-tilt angles with respect to the surfaces of the aligning films 5 and 6, and are twisted and aligned between the substrates 1 and 2.

In the TN mode, the polarizing plate 14 is arranged such that its optical axis (transmission axis or absorption axis) is parallel or perpendicular to one of the aligning directions of the aligning films 5 and 6, and the polarizing plate 15 is arranged such that its optical axis is perpendicular to the optical axis of the polarizing plate 14.

In the STN mode, the polarizing plates 14 and 15 are formed such that one of their optical axes crosses one of the aligning directions of the aligning films 5 and 6 at an angle of about 45° and the other of the optical axes crosses the other of the aligning directions of the aligning films 5 and 6 at an angle of about 45°.

The aligning films 5 and 6 may have flat or uneven surfaces (the aligning film 5 has an uneven surface formed by the TFTs 21, the pixel electrodes 3, and the electric field adjusting layers 10, and the aligning film 6 has an uneven surface formed by the counter electrode 4).

Each electric field adjusting layer 10 consists of a material which is different from the aligning film 5 in at least one of a resistivity and a dielectric constant. For example, the electric field adjusting layers 10 consist of an insulator (dielectric) such as silicon oxide ($SiO_2$) having a resistivity and a dielectric constant which are larger than those of the aligning film 5 consisting of polyimide. The electric field adjusting layers 10 are formed to be distributed on the pixel regions of each pixel electrode 3 at a proper interval.

The electric field adjusting layers 10 are formed at several positions on one pixel. The electric field adjusting layers 10 are formed such that, in each pixel, the total area of regions $P_2$ in which the electric field adjusting layers 10 are formed is almost equal to the total area of regions $P_1$ (the area of the regions $P_1$ may be different from that of the regions $P_2$, that is, the area in which the layers are not provided).

In the above liquid crystal display element, the electric field adjusting layers 10 having a resistivity and a dielectric constant which are larger than those of the aligning film 5 are partially formed on each pixel electrode 3, and the aligning film 5 is formed on the electric field adjusting layers 10 and the parts of the pixel electrode. For this reason, each region $P_1$ in which the electric field adjusting layer 10 is not formed and each region $P_2$ in which the electric field adjusting layer 10 is formed are different from each other in impedance between the pixel electrodes 3 and the counter electrode 4. Therefore, when a voltage is applied across each pixel electrode 3 and the counter electrode 4, the region $P_1$ and the region $P_2$ are different from each other in the strength of an electric field applied to the liquid crystal 9.

More specifically, the impedance between the pixel electrode 3 and the counter electrode 4 in the region $P_1$ is a total of impedances of the aligning films 5 and 6 and the liquid crystal 9, and the impedance between the pixel electrodes 3 and the counter electrode 4 in the region $P_2$ is a total of impedances of the aligning films 5 and 6, the liquid crystal 9, and the electric field adjusting layers 10.

As shown in FIG. 5, when the aligning film 5 is formed to have a flat surface, the thickness of the aligning film 5 becomes thin in the region $P_2$, and the impedance of the aligning film 5 in the region $P_2$ becomes lower than that of the aligning film 5 in the region $P_1$. However, since the resistivity and dielectric constant of the electric field adjusting layers 10 are larger than those of the aligning film 5, the sum of the impedances of the electric field adjusting layer 10 and the aligning film 5 thereon in the region $P_2$ is larger than the impedance of the aligning film 5 in the region $P_1$.

In addition, when the aligning film 5 is formed to have a uniform thickness in the entire region of the aligning film 5, the impedance of the aligning film 5 in the region $P_2$ is almost equal to the impedance of the aligning film 5 in the region $P_1$. Therefore, the sum of impedances of the electric field adjusting layer 10 and the aligning film 5 in the region $P_2$ is larger than the impedance of the aligning film 5 in the region $P_1$ by the impedance of the electric field adjusting layers 10.

Therefore, a strength $V_1$ of an electric field applied to the liquid crystal 9 in the region $P_1$ in which the electric field adjusting layer 10 is not formed and a strength $V_2$ of an electric field applied to the liquid crystal 9 in the region $P_2$ in which the electric field adjusting layer 10 is formed satisfy $V_1 > V_2$.

The molecules 9a are aligned at a tilt angle according to the strength of an electric field applied to the molecules 9a. For this reason, the tilt angle (angle of the director of the molecules 9a with respect to the major surfaces of the substrates 1 and 2) of the molecules 9a obtained when an electric field is applied across the pixel electrodes 3 and the counter electrode 4, as shown in FIG. 5, is large in the region $P_1$ in which the electric field adjusting layer 10 is not formed, and is small in the region $P_2$ in which the electric field adjusting layer 10 is formed.

In this manner, when different aligned states of the molecules 9a in the presence of an electric field are obtained in the regions of each pixel, respectively, the region $P_1$ and the region $P_2$ are different from each other in value Δn.d with respect to a beam incident on the liquid crystal display device at a predetermined incident angle. Therefore, an exit beam passing through the region $P_1$ and an exit beam passing through the region $P_2$ are different from each other in intensity.

The size (area) of each pixel of the liquid crystal display device is about 200 μm×200 μm to 100 μm to 70 μm, and each pixel cannot be visually identified in normal observation. For this reason, a person cannot recognize the difference between light intensities in each pixel. Therefore, the brightness of each pixel is recognized as the average of the intensities of exit beams from the regions $P_1$ and $P_2$ of the corresponding pixel.

Different changes in value Δn.d with respect to the incident angle of a beam are obtained in the regions $P_1$ and $P_2$, respectively. For this reason, the average of the values Δn.d of all the pixels slightly changes even when the incident angle of a beam changes (change amount is smaller than that in the conventional arrangement shown in FIG. 1). Therefore, the dependence of the brightness of the pixels on an observation direction decreases, and a field angle is widened.

The brightness of each pixel will be examined. In the conventional liquid crystal display device shown in FIGS. 1 and 2, the tilt angle of liquid crystal molecules in the presence of an electric field are uniform in each entire pixel. For this reason, when the incident angle of a beam incident on the liquid crystal display device changes, the value Δn.d changes. More specifically, the differences between a value Δn.d(IA) which is the value Δn.d with respect to an incident beam IA, a value Δn.d(IB) which is the value Δn.d with respect to an incident beam IB, and a value Δn.d(IC) which is the value Δn.d with respect to an incident beam IC are large. The intensity of a beam emerging from the polarizing plate 14 on the exit side is dependent on the value Δn.d of the liquid crystal display device. For this reason, in the conventional liquid crystal display device, the brightness of each pixel changes depending on the incident angle of a beam.

In contrast to this, in the liquid crystal display device of this embodiment, the liquid crystal molecules 9a are aligned in the regions $P_1$ and $P_2$ at different tilt angles in the presence of an electric field. For this reason, the different values Δn.d are obtained in the regions $P_1$ and $P_2$, respectively. Therefore, the differences between the average value Δn.d (IA) of the values Δn.d in the regions $P_1$ and $P_2$ with respect to the incident beam IA, the average value Δn.d(IB) of the values Δn.d in the regions $P_1$ and $P_2$ with respect to the incident beam IB, and the average value Δn.d(IC) of the values Δn.d in the regions $P_1$ and $P_2$ with respect to the incident beam IC decrease.

For this reason, the brightness of the pixel recognized as the average of the intensity of an exit beam from the region $P_1$ and the intensity of an exit beam from the region $P_2$ slightly changes even when the incident angle of a beam incident on the liquid crystal display device changes. Therefore, the dependence of the brightness of the pixels on an observation direction decreases, and a field angle becomes wider than the field angle of the conventional liquid crystal display device shown in FIG. 1.

In a conventionally proposed liquid crystal display device using a voltage control scheme, in order to obtain a wide field angle, drive signals having different voltages must be applied to the plurality of electrodes of each pixel, respectively. For this reason, display driving is complicated. However, in the liquid crystal display device of this embodiment, by using a simple arrangement in which the electric field adjusting layers 10 are partially formed on each pixel electrode 3, a wide field angle can be realized. This arrangement can be easily manufactured. In addition, the liquid crystal display device can be easily driven by applying single signals to the electrodes of the liquid crystal display device.

A method of manufacturing the liquid crystal display device described above will be described below.

[Step 1]

The pixel electrodes 3 and the TFTs 21 are formed on the substrate 1. The black masks 7, the transparent insulating film 8, and the counter electrode 4 are sequentially formed on the substrate 2. Note that the pixel electrodes 3 and the counter electrode 4 are formed such that transparent conductive films each consisting of ITO or the like are respectively formed on the substrates 1 and 2 by a sputtering apparatus, and these transparent conductive films are patterned by a photolithographic method.

[Step 2]

The electric field adjusting layers 10 are partially formed on each pixel electrode 3 of the substrate 1. A practical method of forming the electric field adjusting layers 10 will be described later.

[Step 3]

The aligning films 5 and 6 are formed on the electrode formation surfaces of the substrates 1 and 2, respectively. The aligning films 5 and 6 are formed such that: a solution of a polyimide precursor is coated on each of the substrates 1 and 2 by spin coating or the like; the resultant coatings are calcined to form polyimide films; and the surface of each polyimide film is subjected to a rubbing process in a predetermined direction.

[Step 4]

The substrates 1 and 2 are joined to each other through the sealing member 11, and the liquid crystal 9 is held between both the substrates 1 and 2, thereby completing the liquid crystal cell 19. The liquid crystal 9 may be filled between the substrates 1 and 2 by a vacuum injecting method or the like after the substrates 1 and 2 are joined to each other through the sealing member 11, or a proper amount of liquid crystal 9 may be supplied on one of the substrates 1 and 2 before the substrates 1 and 2 are joined to each other.

[Step 5]

The polarizing plates 14 and 15 are formed on both the sides of the completed liquid crystal cell, thereby completing the liquid crystal display device shown in FIG. 3.

Three types of methods of forming the electric field adjusting layers 10 performed in Step 2 will be described below.

(1) Printing Method

Figure 6A:
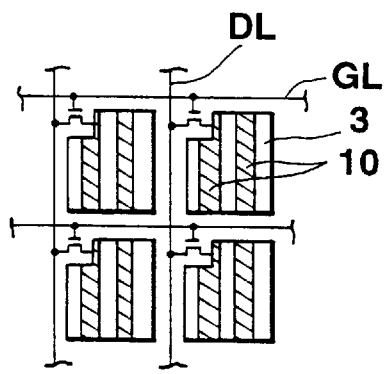
FIGS. 6A and 6B are plan views showing arrangements of electric field adjusting layers, respectively.
Figure 6B:
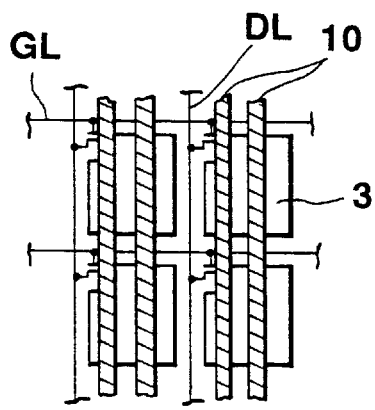

A liquid material, e.g., a liquid material containing an inorganic or organic silicon compound as a main component, which is different from the aligning film 5 in at least one of a resistivity and a dielectric constant obtained after the liquid material is calcined is partially printed in the form of stripes by a screen printing method or a relief printing method, as shown in FIGS. 6A and 6B. The printed films are calcined to form the electric field adjusting layers 10 containing $SiO_2$ as a main component.

According to this printing method, the electric field adjusting layers 10 having the sectional shapes shown in FIG. 3 or 5 can be formed on each pixel electrode 3.

According to the printing method, the electric field adjusting layers 10 each having a desired size can be formed at arbitrary positions on each pixel electrode 3.

(2) Spraying Method

A liquid material, e.g., a liquid material containing an inorganic or organic silicon compound as a main component, which is different from the aligning film in at least one of a resistivity and a dielectric constant obtained after the liquid material is calcined is sprayed by a spray gun or the like to deposit the droplets of the liquid material on the pixel electrodes 3. The deposit is calcined, so that the electric field adjusting layers 10 having the sectional shapes shown in FIG. 7A and containing $SiO_2$ as a main component are formed as shown in the plan view of FIG. 7B.

According to this spraying method, the electric field adjusting layers 10 each having a small size corresponding to the size of each sprayed droplet can be formed to be dispersed at a large number of positions in a unit region. In addition, each electric field adjusting layer 10 formed by this spraying method is a layer having an almost semi-spherical shape shown in FIG. 7A. Therefore, the impedance between the pixel electrodes 3 and the counter electrode 4 continuously changes between a position corresponding to the central portion of each electric field adjusting layer 10 and a position corresponding to the edge portion of the electric field adjusting layer 10. In addition, the electric field adjusting layers 10 properly vary in size.

Therefore, the impedance between the pixel electrodes 3 and the counter electrode 4 can be continuously changed in units of small regions. For this reason, the dependence of the brightness of the pixels on an observation direction can be effectively reduced, and a liquid crystal display device having a wide field angle and good display quality free from nonuniformity of display can be obtained.

(3) Photolithographic Method

On the substrate 1 on which the pixel electrodes 3 are formed, a coating consisting of a material which is different from the aligning film in at least one of a resistivity and a dielectric constant, e.g., a transparent insulating film consisting of an insulator containing $SiO_2$ as a main component or another insulator or a transparent conductive film consisting ITO or the like is formed by a coating apparatus, a plasma CVD apparatus, a sputtering apparatus, a deposition apparatus or the like. The resultant film is patterned by a photolithographic method, as shown in FIGS. 6A, 6B, and 7B to form the electric field adjusting layers 10. FIG. 8 shows the electric field adjusting layers 10 formed on the pixel electrodes 3 by this photolithographic method.

According to the photolithographic method, the electric field adjusting layers 10 each having a desired size can be formed at predetermined positions on each pixel electrode 3. In addition, the electric field adjusting layers 10 each having a small size can be formed. For this reason, the electric field adjusting layers 10 can be formed at the large number of positions in a unit region such that the electric field adjusting layers 10 are dispersed in a predetermined pattern. Therefore, the impedance between the pixel electrodes 3 and the counter electrode 4 can be changed in a predetermined distribution, and a liquid crystal display device having a wide field angle and good display quality free from ununiformity of display can be obtained.

As shown in FIG. 6B or 7B, when the electric field adjusting layers 10 are formed, although the electric field adjusting layers 10 are formed in other regions except for the pixel regions, no problem is posed.

Figure 9:
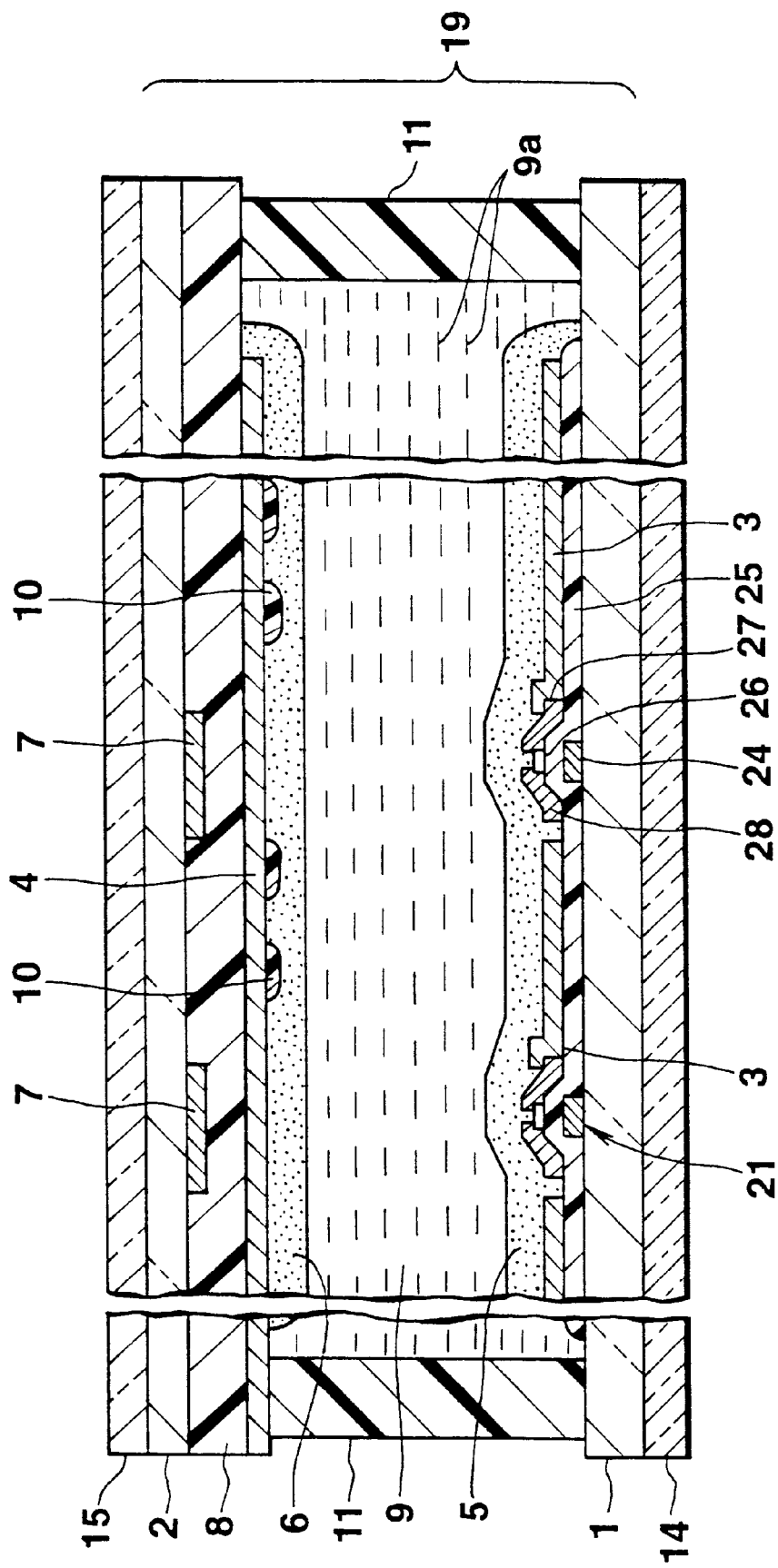
FIG. 9 is a sectional view of a liquid crystal display device having an electric field adjusting layer formed on a counter electrode.

In the above embodiment, the electric field adjusting layers 10 are formed on the pixel electrodes 3, as shown in FIG. 9, the electric field adjusting layers 10 may be formed on the counter electrode 4. In addition, the electric field adjusting layers 10 may be formed on both of the pixel electrodes 3 and the counter electrode 4.

Figure 10:
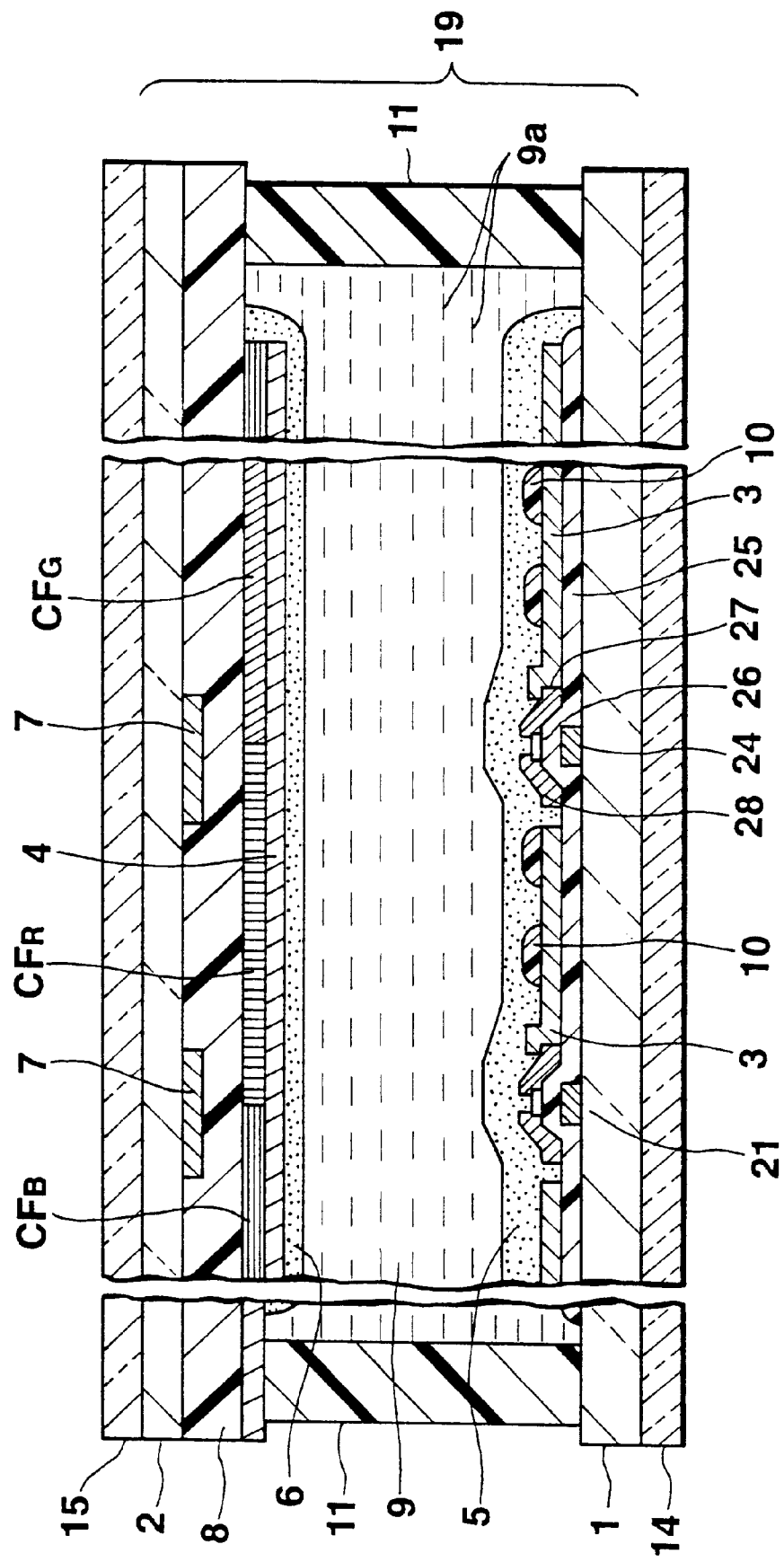
FIG. 10 is a sectional view of a color liquid crystal display device having an electric field adjusting layer.

In the above embodiment, the present invention has been described using a monochrome liquid crystal display device as an example. However, the present invention can be applied to a color liquid crystal display device. For example, as shown in FIG. 10, color filters $CF_R$, $CF_G$, and $CF_B$ of red, green, and blue may be formed on the counter electrode 4, and the electric field adjusting layers 10 may be formed on the pixel electrodes 3.

In the above embodiment, the electric field adjusting layers 10 consist of a transparent insulator containing $SiO_2$ as a main component. However, the electric field adjusting layers 10 may consist of a material different from the aligning film 5 or 6 in at least one of a resistivity and a dielectric constant. That is, the electric field adjusting layers 10 may consist of another transparent insulator such as SiN or the like or a transparent conductor such as ITO or the like.

More specifically, when the electric field adjusting layers 10 are to be formed by a photolithographic method, a photoresist may be used as the material of the electric field adjusting layers 10. In this case, when a photoresist is coated on the pixel electrodes 3 or the counter electrode 4 and subjected to only exposure and development processes, the electric field adjusting layers 10 can be easily formed.

(Second Embodiment)

A liquid crystal display device according to the second embodiment of the present invention will be described below with reference to FIGS. 11 and 12.

Figure 11:
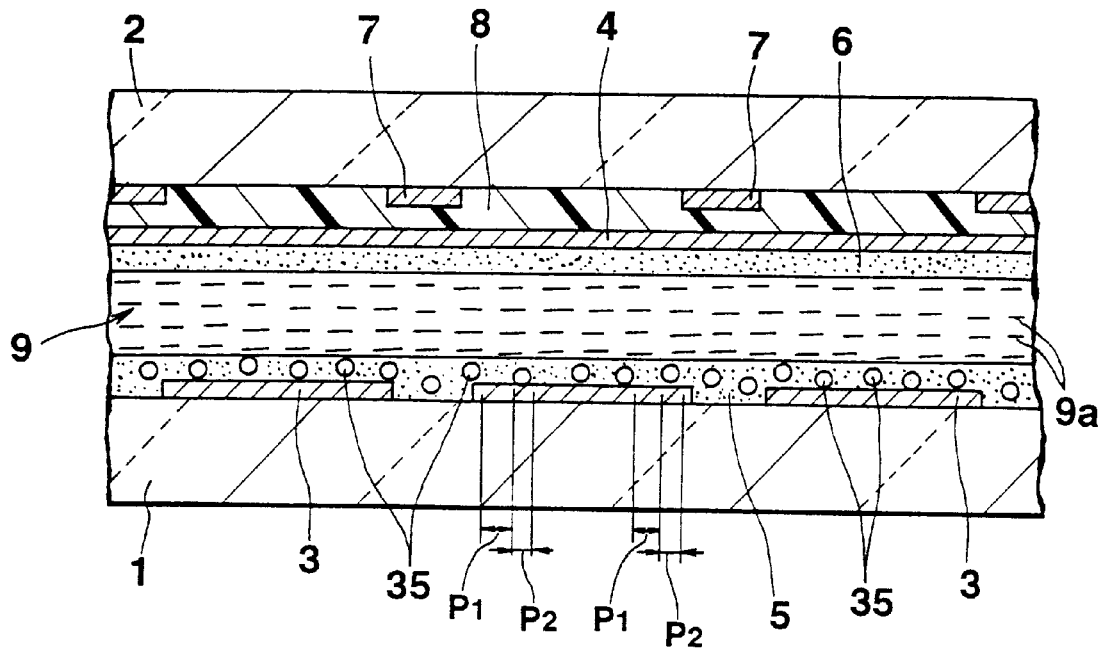
FIG. 11 is a sectional view of a liquid crystal display device according to the second embodiment of the present invention.
Figure 12:
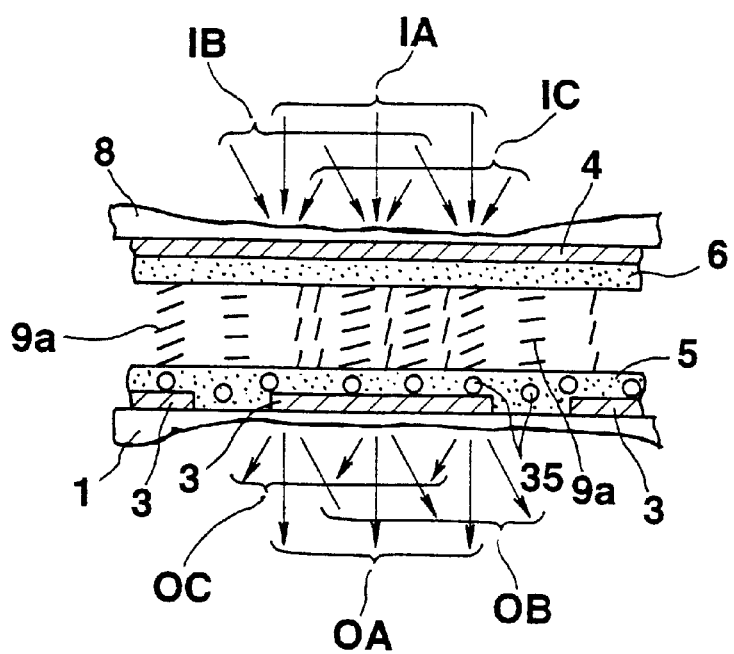
FIG. 12 is a view showing the aligned states of the liquid crystal molecules of the liquid crystal display device shown in FIG. 11 in the presence of an electric field.

FIG. 11 is a sectional view showing the main part of the liquid crystal display device, and FIG. 12 shows the aligned states of liquid crystal molecules upon application of a voltage. Note that the reference numerals as in the liquid crystal display device shown in FIGS. 3 and 5 denote the same parts in FIGS. 11 and 12.

The liquid crystal display device shown in FIG. 11 has a characteristic feature in which electric field adjusting grains 35 are dispersed and mixed in an aligning film, e.g., an aligning film 5, of one of the substrates 1 and 2. Parts other than the parts described above are substantially arranged as in the liquid crystal display device shown in FIG. 3.

Note that the aligning film 5 and an aligning film 6 may have flat surfaces as shown in FIG. 11 and may have uneven surfaces as shown in FIG. 3.

The electric field adjusting grains 35 are grains each having a diameter of about 0.8 to 1.5 $\mu$m and consisting of a material which is different from the aligning film 5 in at least one of a resistivity and a dielectric constant. For example, the aligning film 5 consists of polyimide, and the electric field adjusting grains 35 can be constituted by grains consisting of an insulator, e.g., a transparent insulator containing $SiO_2$ as a main component, having both a resistivity and a dielectric constant which are larger than those of the polyimide serving as an aligning material.

The aligning film 5 in which the electric field adjusting grains 35 are mixed is formed by, e.g., a method in which: a proper amount of electric field adjusting grains 35 is mixed in a solution of a polyimide precursor; the resultant solution is coated on the substrate 1 by a spin coating method or the like; and the coated film is calcined.

The mixing amount of the electric field adjusting grains 35 is set such that the plurality of electric field adjusting grains 35 are distributed in a region (pixel region) in which each pixel electrode 3 opposes a counter electrode 4. More preferably, the mixing amount is set such that a total area of the regions in which the electric field adjusting grains 35 are present is almost equal to a total area of regions in which no electric field adjusting grains 35 are present.

In the above liquid crystal display device, the electric field adjusting grains 35 each having a resistivity and a dielectric constant which are larger than those of the aligning film 5 are dispersed on the pixel electrodes 3. For this reason, a region $P_2$ in which the electric field adjusting grains 35 are present and a region $P_1$ in which no electric field adjusting grains 35 are present are different from each other in impedance between the pixel electrodes 3 and the counter electrode 4. Therefore, as in the first embodiment, electric fields having different strengths corresponding to the differences in impedance are applied to a liquid crystal 9.

More specifically, the electric field adjusting grains 35 consisting of an insulator containing $SiO_2$ as a main component and having a resistivity and a dielectric constant which are higher than those of the aligning film 5. For this reason, a strength $V_1$ of an electric field applied to the liquid crystal 9 in the region $P_1$ in which no electric field adjusting grains 35 are present and a strength $V_2$ of an electric field applied to the liquid crystal 9 in the region $P_2$ in which the electric field adjusting grains 35 are present have a relationship $V_1 > V_2$. For this reason, the tilt angle of molecules 9a obtained when a voltage is applied across the pixel electrodes 3 and the counter electrode 4, as shown in FIG. 12, is large in the region $P_1$ in which no electric field adjusting grains 35 are present in the pixel region and is small in the region $P_2$ in which the electric field adjusting grains 35 are present. That is, two liquid crystal regions having different aligned states are formed in each pixel. Therefore, as in the first embodiment, a field angle is widened. In addition, the liquid crystal display device of the second embodiment can be easily manufactured and can be easily driven as in the first embodiment.

Note that the characteristic feature of the liquid crystal display device of the second embodiment is similar to the characteristic feature of the liquid crystal display device manufactured using the spraying method in the first embodiment.

The electric field adjusting grains 35 may consist of a material which is different from the aligning film 5 in at least one of a resistivity and a dielectric constant. For example, the electric field adjusting grains 35 may consist of a transparent insulator, except for $SiO_2$, such as SiN or a transparent conductor such as ITO or the like. In addition, each electric field adjusting grain 35 need not have a spherical shape, and may have another shape. Moreover, when the electric field adjusting grains 35 consist of a transparent insulator, the diameter of the electric field adjusting grain 35 may be larger than the thickness of the aligning film, and the electric field adjusting grains 35 project from the surface of the aligning film to make the interface between the liquid crystal and the aligning film uneven.

The electric field adjusting grains 35 may be mixed in the aligning film 6, and may be mixed in both the aligning films 5 and 6.

(Third Embodiment)

Figure 1:
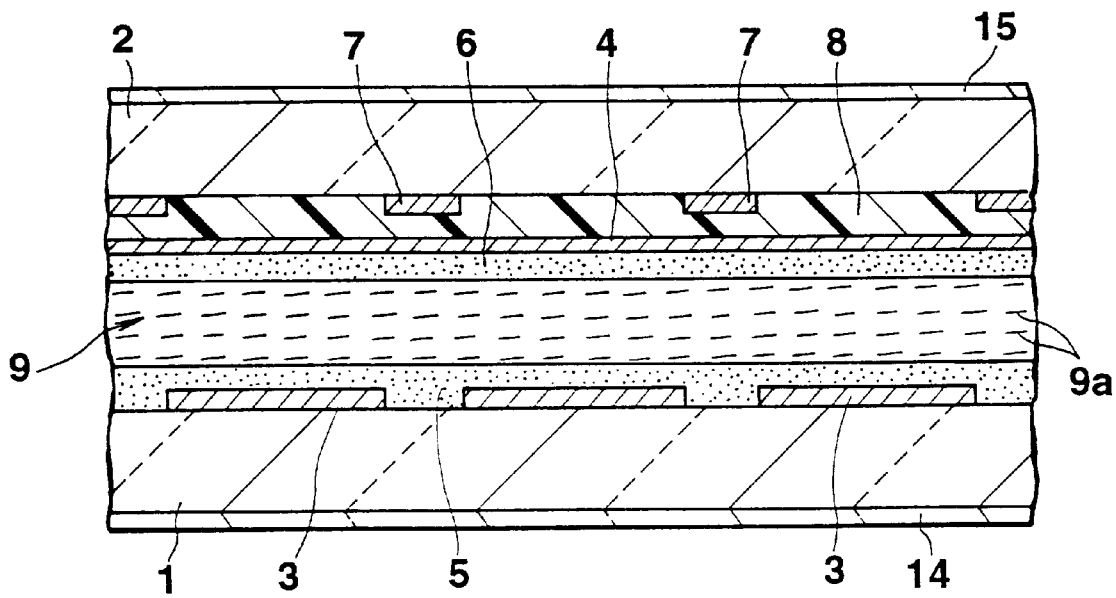
FIG. 1 is a sectional view showing a conventional liquid crystal display device.

In the conventional liquid crystal display device shown in FIG. 1, since the impedance between electrodes is uniform in the entire region of each pixel, an electric field having almost the same strength applied to the entire region of each pixel, and the liquid crystal molecules rise and are aligned at an uniform rise angle. For this reason, the conventional liquid crystal display device has only one type of field angle corresponding to a field angle in the region $P_1$ of the liquid crystal display device shown in FIG. 3 or 11.

For this reason, in the conventional liquid crystal display device, a dependence of the contrast of a display image on a visual angle is large. In order to widen the field angle, the brightness of the display must be sacrificed, and a value $\Delta n.d$ must be decreased to 210 to 600 nm. However, each of the liquid crystal display devices based on the first and second embodiments has two field angles of the regions $P_1$ and $P_2$ as described above, and a field angle obtained by synthesizing the two field angles is used as the field angle of each pixel. Therefore, if the value Δn.d exceeds 600 nm, a wide field angle can be obtained.

Figure 13:
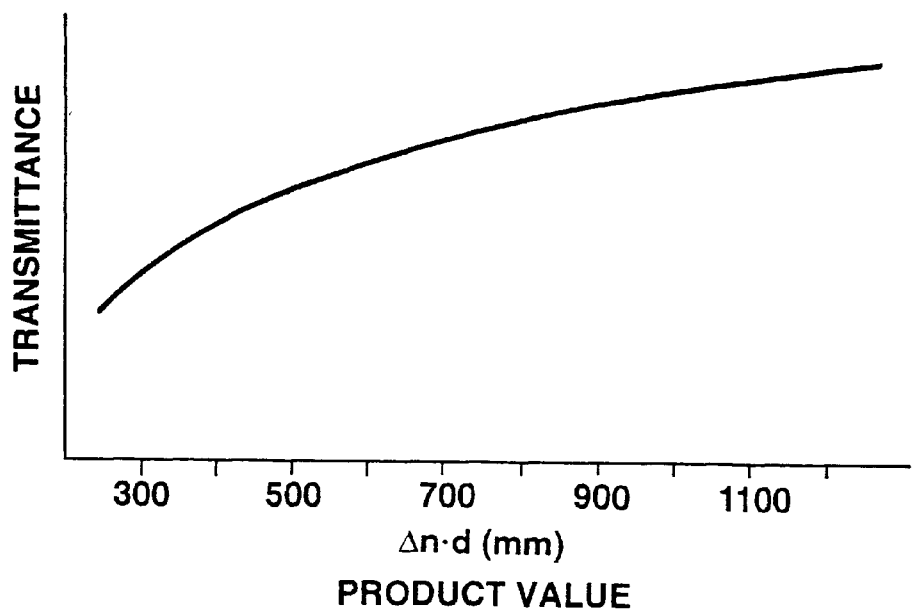
FIG. 13 is a graph showing the general relationship between the value Δn.d and transmittance of a TN type liquid crystal display device.
Figure 14:
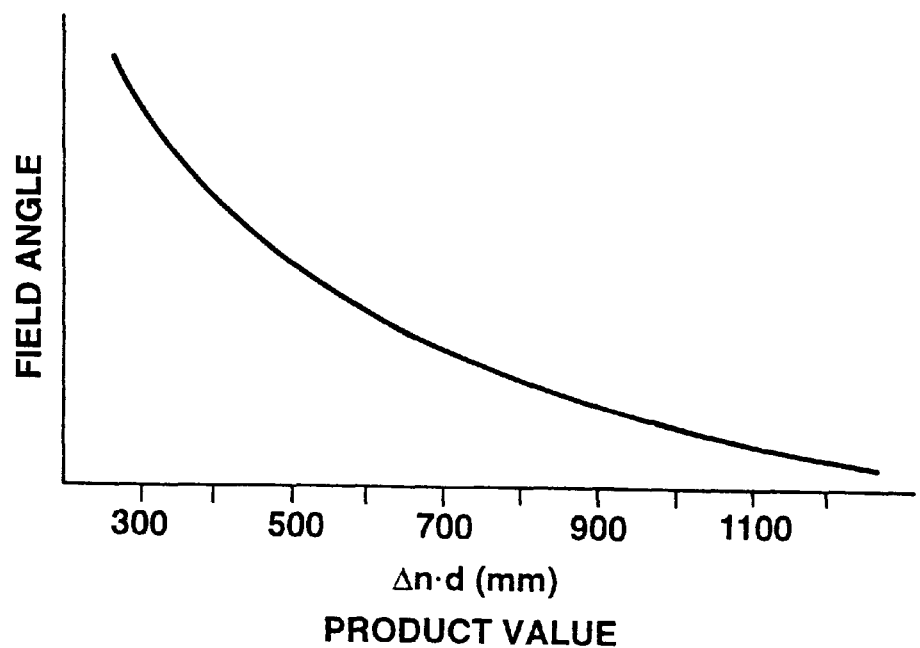
FIG. 14 is a graph showing the general relationship between the value Δn.d and field angle of the TN type liquid crystal display device.

This point will be described in detail. FIG. 13 is a graph showing the relationship between the value Δn.d of the liquid crystal display device and the transmittance thereof, and FIG. 14 is a graph showing the relationship between the value Δn.d of the liquid crystal display device and the field angle thereof. FIGS. 13 and 14 show results obtained such that the value Δn.d of the conventional liquid crystal display device shown in FIG. 1 is changed every interval of 10 nm within the range of 300 to 1,200 nm, and a transmittance and a field angle with respect to each value Δn.d are examined.

As shown in FIG. 13, the transmittance and field angle of the liquid crystal display element change depending on the value Δn.d. If the value Δn.d exceeds 600 nm, e.g., 610 nm or more, a sufficient transmittance can be obtained. As the value Δn.d is increase, the transmittance increases.

As shown in FIG. 14, the field angle becomes narrow as the value Δn.d increases. For this reason, as in the first and second embodiments described above, when the value Δn.d is increased, the field angle becomes narrow accordingly.

That is, the brightness of a display has a trade-off relationship with the field angle with respect to the value Δn.d.

In each of the first and second embodiments, a field angle wider than a conventional one is obtained by making the regions $P_1$ and $P_2$ different from each other in the aligned states of the liquid crystal molecules. For this reason, even if the value Δn.d exceeds 600 nm, a wide field angle can be kept. In addition, when the value Δn.d falls within the range of 650 to 1,200 nm, a bright display can be obtained while a field angle is kept wide. Moreover, the value Δn.d is set to fall within the range of 700 to 1,100 nm, a brighter display can be obtained while a field angle is kept wider.

Therefore, in each of the liquid crystal display devices of the first and second embodiments, the material of the liquid crystal 9 and the thickness of the layer of the liquid crystal 9 are preferably set such that the value Δn.d is set to exceed 600 nm, preferably, set to fall within the range of 650 to 1,200 nm, and, more preferably, set to fall within the range of 700 to 1,100 nm.

(Fourth Embodiment)

A liquid crystal display device according to the fourth embodiment of the present invention will be described below with reference to FIG. 15.

Figure 15:
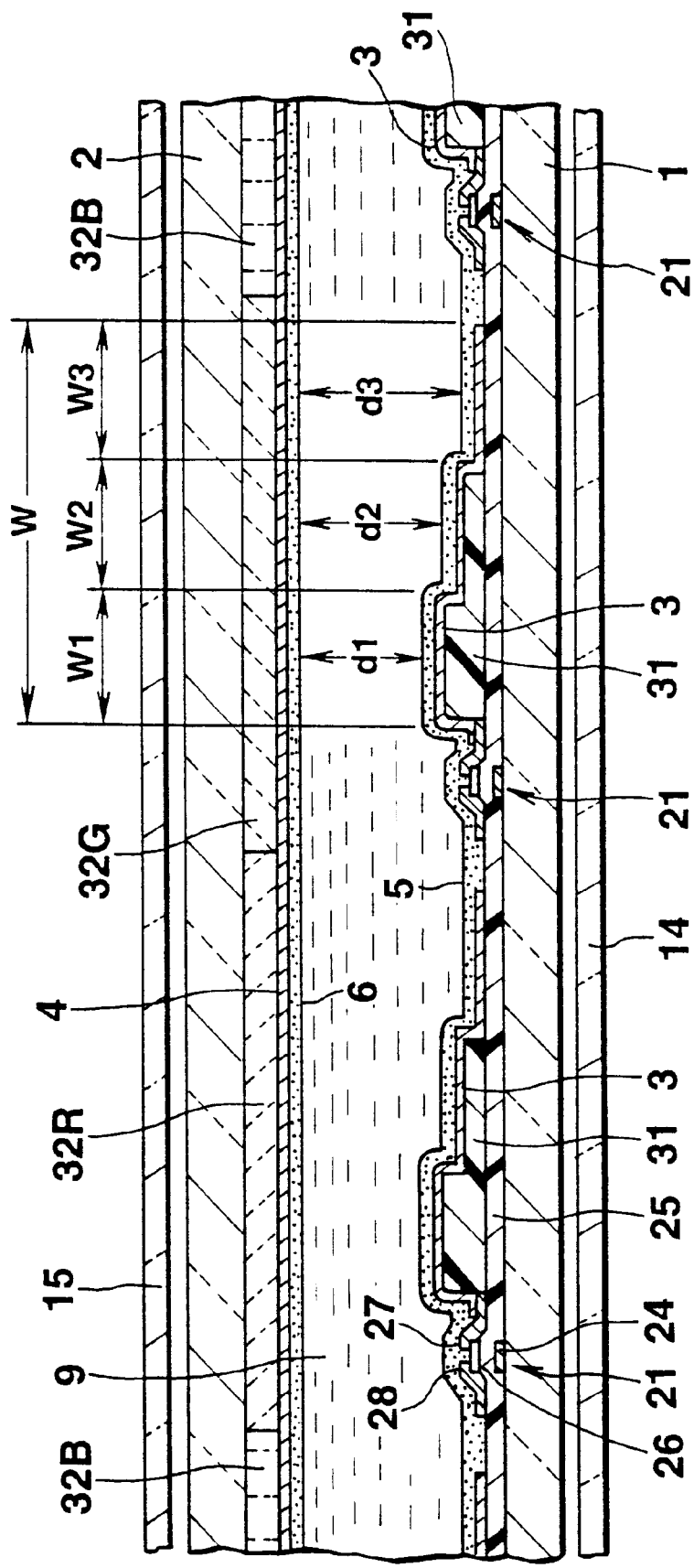
FIG. 15 is a sectional view showing a liquid crystal display device according to the fourth embodiment of the present invention.

FIG. 15 is a sectional view showing part of the liquid crystal cell of the liquid crystal display device. The same reference numerals as in FIGS. 3 and 4 denote the same parts in FIG. 15.

The liquid crystal display device of this embodiment is a TN type active matrix liquid crystal display device. As in the first embodiment, a plurality of transparent pixel electrodes 3 and a plurality of TFTs 21 are arranged in a matrix on a lower substrate 1 of a pair of substrates 1 and 2 which oppose each other to interpose the layer of a liquid crystal 9. An aligning film 5 is formed on the pixel electrodes 3 and the TFTs 21.

Each TFT 21, as in the first embodiment, is constituted by: a gate electrode 24; a gate insulating film 25; a semiconductor layer 26; a source electrode 27; and a drain electrode 28.

The gate insulating film 25 consists of a silicon nitride (SiN) or the like and covers the entire surface of the substrate 1.

On the gate insulating film 25, an underlying film 31 constituted by a transparent insulating film such as an SiN film is formed in the formation region of each pixel electrode 3. Each pixel electrode 3 is formed on a portion extending form the underlying film 31 to the gate insulating film 25. Each pixel electrode 3 has one end portion connected to the source electrode 27 of a corresponding one of the TFTs 21.

Each underlying film 31 is formed in a region extending from one end of a corresponding one of the pixel electrodes 3 and having a width which is almost ⅔ a width W of the pixel electrode 3. A half-width portion of the underlying film 31, i.e., a portion extending from one end of the pixel electrode 3 and having a width which is almost ⅓ the pixel electrode width W is formed to have a thickness larger than the thickness of a portion corresponding to the central portion of the pixel electrode 3.

Each underlying film 31 is constituted by: a first insulating film formed on the gate insulating film 25 from one end of a corresponding one of the pixel electrodes 3 and having a width which is almost ⅔ the width W of the pixel electrode 3; and a second insulating film formed on the first insulating film from one end of a corresponding one of the pixel electrodes 3 and having a width which is almost ⅓ the pixel electrode width W.

Each pixel electrode 3 is formed on a portion extending from a corresponding one of the underlying films 31 to the gate insulating film 25 to have a uniform thickness. Therefore, each pixel electrode 3 has a step-like structure having step differences such that the surface levels of regions W1, W2, and W3 each having a width which is almost ⅓ the width of the pixel electrode 3 are different from each other.

The aligning film 5 formed on the pixel electrodes 3 has an almost uniform thickness. Therefore, the surface of the aligning film 5 has step differences corresponding to the step differences of each pixel electrode 3.

Referring to FIG. 15, on the upper substrate 2, color filters of a plurality of colors, e.g., a red filter 32R, a green filter 32G, and a blue filter 32B are alternately formed in correspondence with the pixel electrodes 3. A transparent counter electrode 4 opposing all the pixel electrodes 3 is formed on the color filters 32R, 32G, and 32B. An aligning film 6 is formed on the counter electrode 4.

The color filters 32R, 32G, and 32B are formed to have almost the same thickness, and the counter electrode 4 and the aligning film 6 each having a uniform thickness are formed on the color filters 32R, 32G, and 32B. Therefore, the aligning film 6 has an almost flat surface.

The substrates 1 and 2 are joined to each other at their edge portions through a frame-like seal member, and the liquid crystal 9 is filled in a region surrounded by the seal member between the substrates 1 and 2.

The liquid crystal 9 consists of a nematic liquid crystal having positive dielectric anisotropy, the aligning direction of the molecules of the liquid crystal 9 is limited to the aligning films 5 and 6, and the molecules are twisted and aligned at a twist angle of 90° between the substrates 1 and 2.

Polarizing plates 14 and 15 are formed on the outer surfaces of the substrates 1 and 2, respectively. The liquid crystal display device according to this embodiment is a positive display type liquid crystal display device in which a display is bright when no voltage is applied, i.e., when the liquid crystal molecules are set in a twisted and aligned state, and a display is dark when the liquid crystal molecules are vertically aligned by applying a voltage. Therefore, the polarizing plates 14 and 15 are formed such that their polarizing axes (transmission axes or absorption axes) are perpendicular to each other.

In the liquid crystal display device of this embodiment, each pixel electrode 3 has a structure having step differences such that the regions W1, W2, and W3 each having a width which is almost ⅓ the width W of each pixel electrode 3 have different levels. For this reason, different thicknesses (intervals between the aligning films 5 and 6) d1, d2, and d3 of the layer of the liquid crystal 9 at each pixel portion (portion where each pixel electrode 3 opposes the counter electrode 4) of the liquid crystal display device are obtained in the three regions W1, W2, and W2, respectively. Therefore, in this liquid crystal display device, values Δn.d and threshold voltages Vth are different in the regions W1, W2, and W3, respectively.

The thicknesses d1, d2, and d3 of the layer of the liquid crystal 9 in the regions W1, W2, and W3 satisfy d1<d2<d3. For this reason, the values Δn.d of the regions W1, W2, and W3, i.e., values Δn.d1, Δn.d2, and Δn.d3, satisfy Δn.d1<Δn.d2<Δn.d3.

As described above since the different values Δn.d can be obtained in the regions W1, W2, and W3, respectively, the regions W1, W2, and W3 are different from each other in transmittance and field angle.

Figure 16:
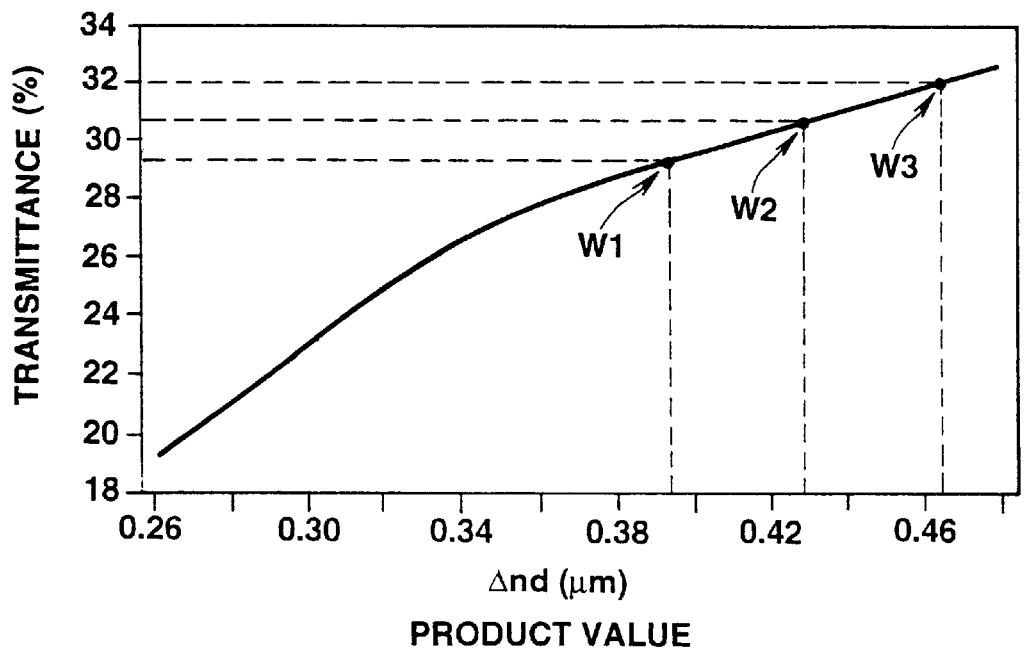
FIG. 16 is a graph showing the general relationship between the value Δn.d and transmittance of a TN type liquid crystal display device.
Figure 17:
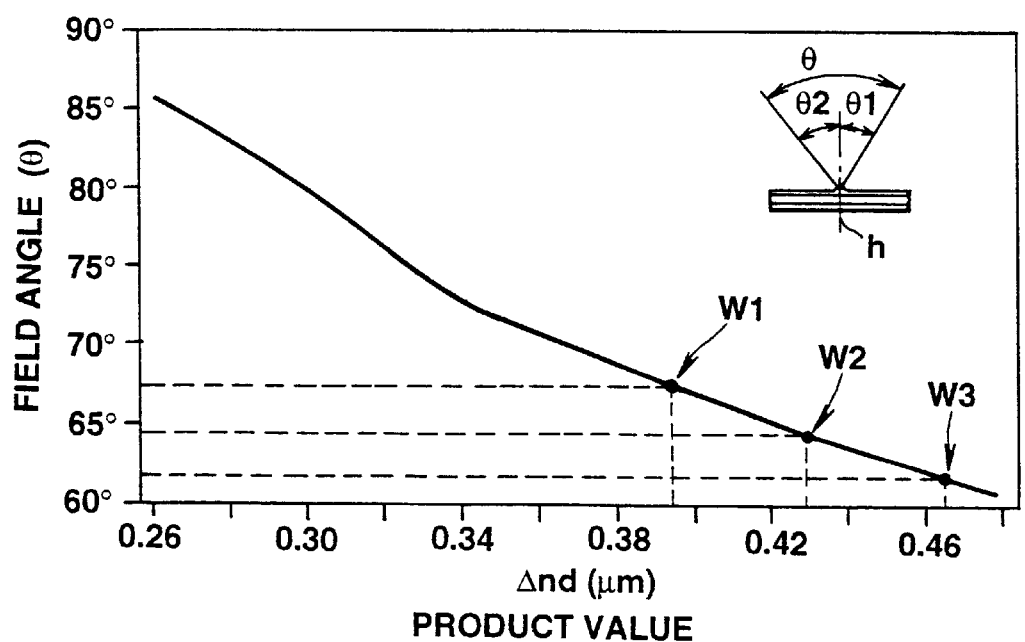
FIG. 17 is a graph showing the general relationship between the value Δn.d and field angle of the TN type liquid crystal display device.

FIG. 16 shows the general relationship between the value Δn.d and transmittance of a TN type liquid crystal display device, and FIG. 17 shows the general relationship between the value Δn.d and field angle of the TN type liquid crystal display device. FIGS. 16 and 17 show results obtained when the value Δn.d is changed within the range of 0.26 μm to 0.48 μm, a voltage at which the maximum transmittance can be obtained is applied, and a transmittance and a field angle are examined.

A transmittance shown in FIG. 16 is a transmittance of the liquid crystal display device in a normal direction, and a field angle (θ) shown in FIG. 17 is the sum (θ=θ1+θ2) of a field angle θ1 of a direction in which the smallest field angle is obtained with respect to a normal h of the liquid crystal display device and a field angle θ2 of a direction in which the largest field angle is obtained with respect to the normal h.

As shown in FIGS. 16 and 17, the transmittance and the field angle change depending on the value Δn.d. When the value Δn.d falls within the range of 0.26 μm to 0.48 μm, the transmittance is in proportion to the value Δn.d, and, in contrast to this, the field angle is in inverse proportion to the value Δn.d.

In the above liquid crystal display device, each pixel is divided into the three regions W1, W2, and W3 respectively having different transmittances. For this reason, the value Δn.d of at least one of the regions W1, W2, and W3 is set such that a high transmittance can be obtained, and the average transmittance of the entire pixel portion can be increased.

The transmittances of the regions W1, W2, and W3 will be exemplified below. For example, assume that the refractive anisotropy Δn of the liquid crystal 9 and the liquid crystal layer thicknesses d1, d2, and d3 of the regions W1, W2, and W3 are represented by:

Δn=0.09 d1=4.38 μm d2=4.75 μm d3=5.15 μm the values Δn.d of the regions W1, W2, and W3, i.e., the values Δn.d1, Δn.d2, and Δn.d3, are represented by:

Δn.d1=0.3942 μm

Δn.d2=0.4275 μm

Δn.d3=0.4635 μm

Note that m.p (crystal phase-liquid crystal phase transition point) is −25° C. or less, and c.p (liquid crystal phase-isotropic phase transition point) is 85° C.

As described above, the transmittances of the regions W1, W2, and W3 obtained when the values Δn.d of the regions W1, W2, and W3 are set, as shown in FIG. 16, are about 29%, about 31%, and about 32%, respectively. The transmittances of all the regions are considerably high. Therefore, the average transmittance of all the pixels is high, thereby obtaining a bright display.

The field angles of the regions W1, W2, and W3 obtained when the values Δn.d of the regions W1, W2, and W3 are set to obtain the above high transmittances, as shown in FIG. 17, are about 67.5°, about 64.5°, and about 62°, respectively.

In the liquid crystal display device of this embodiment, the liquid crystal layer thicknesses d1, d2, and d3 of the regions W1, W2, and W3 are different from each other. The threshold voltages Vth applied to the regions W1, W2, and W3 are different from each other accordingly. For this reason, when a voltage is applied across the pixel electrodes 3 and the counter electrode 4, different aligned states of liquid crystal molecules are obtained in the regions W1, W2, and W3. Therefore, the field angles of the entire pixel portion upon application of a voltage is apparently widened.

Figure 18:
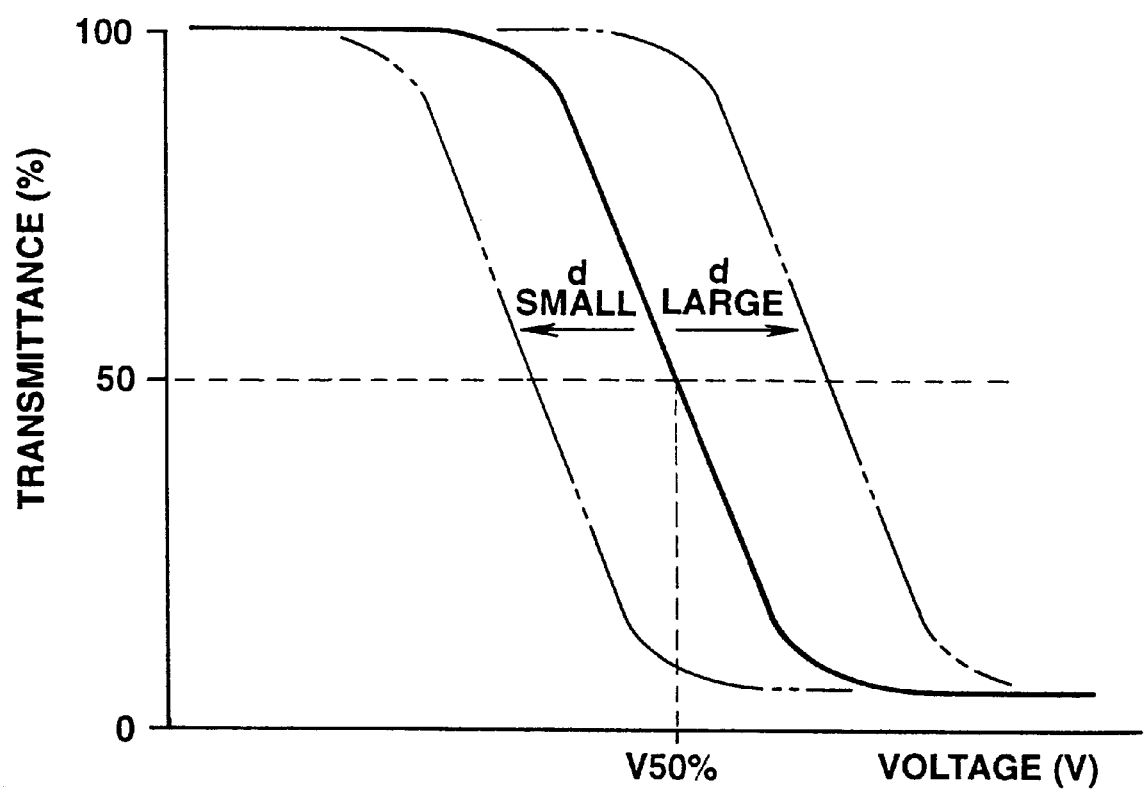
FIG. 18 is a graph showing the general relationship between a voltage applied to the TN type liquid crystal display device and the transmittance of the TN type liquid crystal display device.

More specifically, FIG. 18 shows the voltage-transmittance characteristic curve of a TN type liquid crystal display device. This characteristic curve is shifted in the left direction (FIG. 18) as a liquid crystal layer thickness d is decreased, and the characteristic curve is shifted in the right direction (FIG. 18) as the liquid crystal layer thickness d is increased. For this reason, a threshold voltage Vth1 of the region W1, a threshold voltage Vth2 of the region W2, and a threshold voltage Vth3 of the region W3 satisfy Vth1<Vth2<Vth3. Note that V50% represents a voltage applied when a transmittance becomes 50%, provided that the maximum transmittance is set to be 100%.

More specifically, assume that the liquid crystal 9 (liquid crystal having m.p=−25° C. or less, c.p=85° C., Δn=0.09), and the liquid crystal layer thicknesses d1, d2, and d3 of the regions W1, W2, and W3 are represented by d1=4.38 μm, d2=4.75 μm, and d3=5.15 μm, as described above. In this case, the values of V50% (values at 25° C.) are represented by V50%=2.07 V in region W1 (d1=4.38 μm)

V50%=2.12 V in region W2 (d1=4.75 μm)

V50%=2.16 V in region W3 (d1=5.15 μm)

Therefore, the regions W1, W2, and W3 have threshold voltage differences corresponding to the differences of the values of V50%.

A voltage applied across the pixel electrodes 3 and the counter electrode 4 is uniformly applied to all the regions W1, W2, and W3. However, the threshold voltages Vth1, Vth2, and Vth3 of the regions W1, W2, and W3 are different from each other. For this reason, upon application of a voltage, different aligned states of liquid crystal molecules are obtained in these regions, respectively. Therefore, in a bright display, different field angles are obtained in the regions W1, W2, and W3, respectively.

For this reason, when a voltage is applied to the liquid crystal display device, the apparent field angle of the entire pixel falls within the range including the all field angles of the bright displays of the regions W1, W2, and W3. For example, even when the display is viewed from a direction falling outside the field angle range of one or two of the bright displays in the three regions W1, W2, and W3, when this observation direction falls within the field angle range of the bright display of another region, the bright pixel can be observed.

Therefore, according to the above liquid crystal display device, a field angle can be widened while the display is kept bright.

In the above embodiment, all the values Δn.d1, Δn.d2, and Δn.d3 are set to obtain high transmittances, and wide field angles can be obtained by the differences in the threshold voltages Vth of the regions W1, W2, and W3. However, any one of the values Δn.d of the regions W1, W2, and W3 may be set to obtain a wide field angle (Δn.d=about 0.26 to 0.36 μm). In this manner, although the brightness of the display slightly decreases, the field angle obtained by the differences of the threshold voltages Vth can be widened, and the field angle determined by the values Δn.d can also be widened.

Even when the liquid crystal layer thicknesses d1, d2, and d3 of the regions W1, W2, and W3 do not satisfy d1<d2<d3, the above effect can be obtained, provided that the liquid crystal layer thicknesses of the regions W1, W2, and W3 are different from each other. In addition, the regions having the same liquid crystal layer thickness may be alternately formed.

In the arrangement of FIG. 15, although a pixel is divided into the three regions W1, W2, and W3, the number of regions may be arbitrarily set to be 2 or more.

Figure 19:
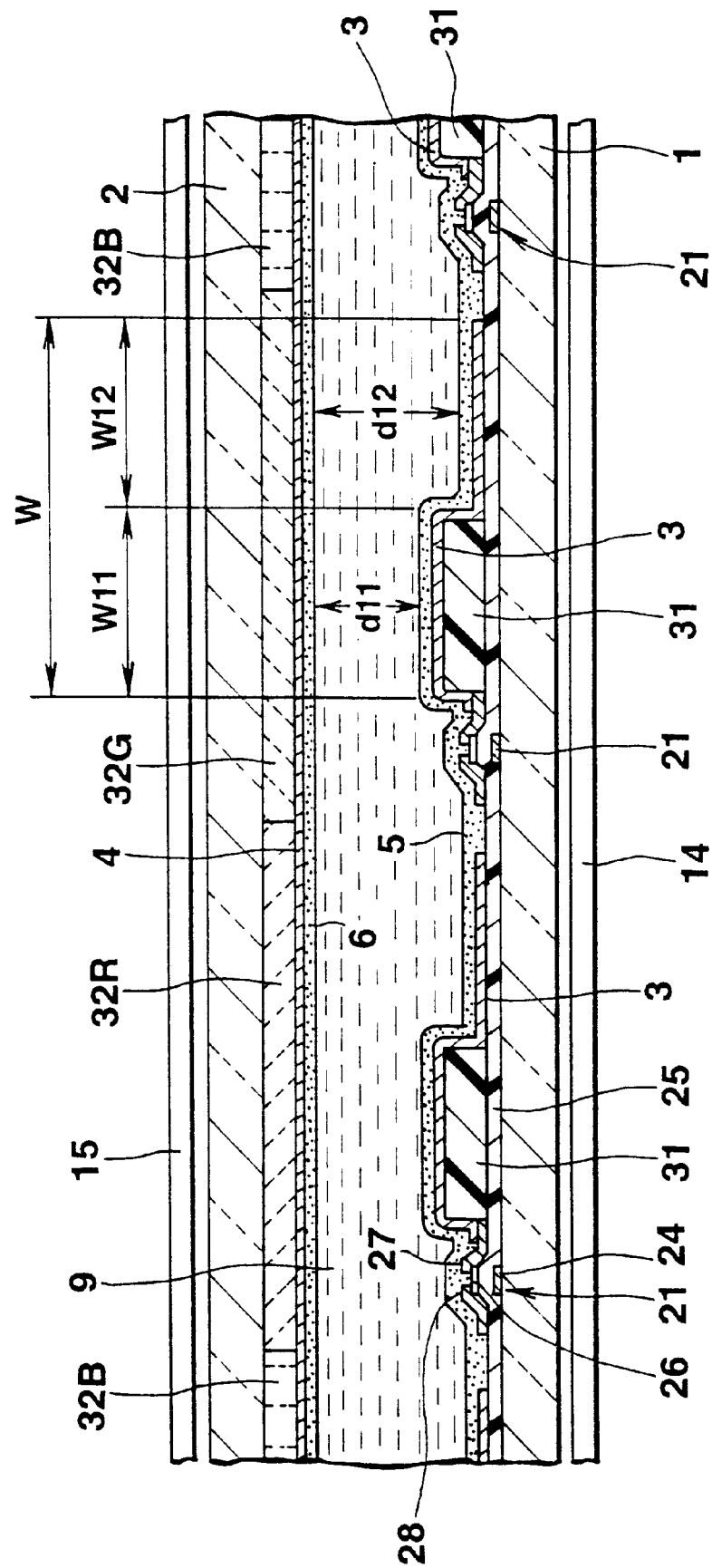
FIG. 19 is a sectional view showing a modification of the liquid crystal display device shown in FIG. 15.

FIG. 19 shows a liquid crystal display device having the following arrangement. That is, each pixel is divided into two regions W11 and W12, and liquid crystal layer thicknesses d11 and d12 of the regions W11 and W12 are made different from each other to make the areas W11 and W12 different from each other in value Δn.d and threshold voltage Vth.

In the liquid crystal display device having the arrangement in FIG. 19, when the value Δn.d of at least one of the regions W11 and W12 is set to obtain a high transmittance, the average transmittance of the entire pixel can be increased.

For example, assume that the above liquid crystal (liquid crystal having m.p =−25° C. or less, c.p=85° C., Δn=0.09) is used, and the liquid crystal layer thicknesses d11 and d12 of the regions W11 and W12 are made equal to the liquid crystal layer thicknesses d1 and d3 of the above regions W1 and W3 (d11=4.38 μm, d12=5.15 μm), respectively. In this case, the values Δn.d of the regions W11 and W12, i.e., Δn.d11 and Δn.d12, are represented by Δn.d11=0.3942 μm Δn.d12=0.4635 μm When the values Δn.d11 and Δn.d12 are set as described above, the transmittances of the regions W11 and W12 are about 29% and about 32%, respectively, resulting in the high transmittances. Therefore, a bright display can be obtained in the entire pixel.

In this case, the values of V50% (values at 25° C.) shown in FIG. 18 are as follows.

V50%=2.07 V in region W11 (d11=4.38 μm)

V50%=2.16 V in region W12 (d12=5.15 μm)

Therefore, the regions W11 and W12 have a difference in threshold voltage corresponding to the difference in value of V50%.

Although a voltage across the pixel electrode 3 and the counter electrode 4 in the regions W11 and W12 are equal to each other, the threshold voltages Vth11 and Vth12 of the regions W11 and W12 are different from each other. For this reason, the aligned states of the regions W11 and W12 are different from each other, and the field angles of the bright displays of the regions W11 and W12 are different from each other.

The field angle of the entire pixel falls within the range including the field angles of the bright displays of the regions W11 and W12. Therefore, in the liquid crystal display device of FIG. 19, the field angle can be widened while a sufficiently bright display is secured.

Note that, in this description, the values Δn.d11 and Δn.d12 are set to obtain high transmittances, and a wide field angle can be secured by the difference in threshold voltage Vth of the regions W11 and W12. However, any one of the values Δn.d11 and Δn.d12 may be set at a value (about 0.26 to 0.36 μm) at which a wide field angle can be obtained.

FIGS. 15 and 19 show the embodiments in which each pixel region is divided into three or two regions. However, the present invention is not limited to the embodiments. For example, a pixel portion may be divided into four regions in the row and column directions. In addition, the ratio of areas of the divided regions may be arbitrarily set.

In each of the above embodiments, the underlying film 31 having a step difference is formed, and an ITO film having a uniform thickness is formed on the underlying film 31, thereby forming the pixel electrodes 3 each having a step difference. However, for example, the ITO film having a nonuniform thickness may be formed to form the pixel electrodes 3 each having a step difference.

In the above description, although each pixel electrode 3 has a step-like shape to make the thickness of the layer of the liquid crystal 9 nonuniform, a portion of the counter electrode 4, opposing each pixel electrode 3, may have a shape having a step difference.

In each of the first to third embodiments, the present invention has been described using an active matrix liquid crystal display device using TFTs as switching elements. However, the present invention can also be applied to an active matrix liquid crystal display device using MIMs as switching elements and to a simple matrix liquid crystal display device. In addition, the present invention can be applied to not only a TN type liquid crystal display device but also an STN type dot matrix liquid crystal display device.

In each of the above embodiments, although the present invention has been described using a transmission type liquid crystal display device, the present invention can be applied to a reflection type liquid crystal display device.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A liquid crystal display device comprising:

first and second substrates arranged to oppose each other;

a first transparent electrode arranged on a surface of said first substrate opposing said second substrate;

a second transparent electrode arranged on a surface of said second substrate opposing said first substrate;

said first and second electrodes forming a pixel and said first electrode having a surface having a step in said pixel;

a transparent insulating material provided between the first electrode and the first substrate in a region corresponding to said pixel to define the step of the first electrode; and a liquid crystal, consisting of a nematic liquid crystal having positive dielectric anisotropy and a chiral liquid crystal, arranged between said first and second electrodes, said liquid crystal having a difference in thickness in said pixel in accordance with a step difference of the surface of said first electrode, wherein a plurality of regions, where liquid crystal molecules are orientated at different tilt angles with reference to the substrates, are formed in said pixel, thereby causing light outputs from said regions to vary in optical intensity such that optical intensities of the light outputs have reduced dependency on angles of incidence of incident light.

2. A device according to claim 1, comprising a plurality of first and second electrodes forming a plurality of pixels, said first electrodes having a surface having a step in each pixel, and wherein said liquid crystal has a difference in thickness in each pixel in accordance with a step difference of the surface of said first electrode.

3. A device according to claim 1, wherein said liquid crystal includes regions which are different from each other in product $\Delta n.d$ between an optical anisotropy $\Delta n$ and a layer thickness in accordance with a step difference on the surface of said first electrode in said pixel.

4. A liquid crystal display device comprising:

first and second substrates arranged to oppose each other;

a first electrode arranged on a surface of said first substrate opposing said second substrate;

a second electrode arranged on a surface of said second substrate opposing said first substrate;

said first and second electrodes forming a pixel and said first electrode having a surface having a step in said pixel; and a liquid crystal, consisting of a nematic liquid crystal having positive dielectric anisotropy and a chiral liquid crystal, arranged between said first and second electrodes, said liquid crystal having a difference in thickness in said pixel in accordance with a step difference of the surface of said first electrode, wherein a plurality of materials which are different from each other in at least one of a resistivity and a dielectric constant are arranged between said first and second substrates in a plurality of regions which are different from each other in impedance, wherein a plurality of regions, where liquid crystal molecules are orientated at different tilt angles with reference to the substrates, are formed in said pixel, thereby causing light outputs from said regions to vary in optical intensity such that optical intensities of the light outputs have reduced dependency on angles of incidence of incident light.

* * * * *